(12) United States Patent
Wardropper et al.

(10) Patent No.: US 10,384,404 B2
(45) Date of Patent: Aug. 20, 2019

(54) WIND TURBINE COMPONENTS

(71) Applicant: Vestas Wind Systems A/S, Aarhus N. (DK)

(72) Inventors: Steve Wardropper, Hampshire (GB); Ryan Bacon, Yarmouth (GB)

(73) Assignee: Vestas Wind Systems A/S, Aarhus N. (DK)

(*) Notice: Subject to any disclaimer, the term of this patent is extended or adjusted under 35 U.S.C. 154(b) by 102 days.

(21) Appl. No.: 15/116,099

(22) PCT Filed: Feb. 2, 2015

(86) PCT No.: PCT/DK2015/050022
§ 371 (c)(1),
(2) Date: Aug. 2, 2016

(87) PCT Pub. No.: WO2015/113571
PCT Pub. Date: Aug. 6, 2015

(65) Prior Publication Data
US 2017/0165924 A1    Jun. 15, 2017

(30) Foreign Application Priority Data
Feb. 3, 2014    (GB) .................................. 1401768.5

(51) Int. Cl.
*B29C 70/42* (2006.01)
*F03D 1/06* (2006.01)
(Continued)

(52) U.S. Cl.
CPC ............ *B29C 70/42* (2013.01); *B29B 13/023* (2013.01); *B29C 70/44* (2013.01);
(Continued)

(58) Field of Classification Search
CPC ....... B29C 70/42; B29C 70/36; B29C 70/443; B29C 70/44; B29C 70/48; B32B 38/004;
(Continued)

(56) References Cited

U.S. PATENT DOCUMENTS 3,526,188 A * 9/1970 Carlsson ................... B30B 1/34
100/257
4,267,147 A * 5/1981 Pogoda ................... B29C 33/02
264/113
(Continued)

FOREIGN PATENT DOCUMENTS

CN        87102407 A    11/1987
CN        103042701     4/2013
(Continued)

OTHER PUBLICATIONS

International Searching Authority, Search Report and Written Opinion Issued in Corresponding International Application No. PCT/DK2015/050022, dated Apr. 23, 2015.
(Continued)

*Primary Examiner* — Anthony Calandra
*Assistant Examiner* — Jerzi H Moreno Hernandez
(74) *Attorney, Agent, or Firm* — Wood Herron & Evans LLP

(57) ABSTRACT

A method of making a wind turbine component comprises providing a mold (7), placing a fibrous pre-form (60) in the mold (70), admitting resin into the mold and curing the resin. The method further comprises heating (58) the fibrous pre-form before placing the pre-form in the mold.

20 Claims, 5 Drawing Sheets

(51) Int. Cl.
  *B29C 70/44*  (2006.01)
  *B29D 99/00*  (2010.01)
  *B29B 13/02*  (2006.01)
  *B29L 31/00*  (2006.01)

(52) U.S. Cl.
  CPC ....... *B29D 99/0028* (2013.01); *F03D 1/0675* (2013.01); *B29L 2031/7504* (2013.01); *F05B 2230/50* (2013.01); *F05B 2240/21* (2013.01); *F05B 2280/6003* (2013.01); *Y02E 10/721* (2013.01); *Y02P 70/523* (2015.11)

(58) Field of Classification Search
  CPC .......... F05B 2280/6003; F05B 2230/50; F05B 2240/21; F03D 1/0675; B29L 2031/7504; B29L 2031/085; B29L 2031/082; B29D 99/0025; B29D 99/0028
  See application file for complete search history.

(56) References Cited

U.S. PATENT DOCUMENTS

| | | | |
|---|---|---|---|
| 4,385,957 A | 5/1983 | Wackerle et al. | |
| 4,663,225 A | 5/1987 | Farley et al. | |
| 4,874,564 A * | 10/1989 | Sudani | B28B 3/025 264/137 |
| 4,992,228 A * | 2/1991 | Heck | B29B 15/105 264/135 |
| 5,047,198 A * | 9/1991 | Kim | B29C 33/02 249/112 |
| 5,178,708 A * | 1/1993 | Hara | B29C 33/12 156/242 |
| 5,196,152 A * | 3/1993 | Gamache | B29C 67/246 264/163 |
| 5,609,934 A * | 3/1997 | Fay | B32B 3/04 428/74 |
| 6,264,877 B1 | 7/2001 | Pallu De La Barriere | |
| 6,485,668 B1 * | 11/2002 | Murphy | B29C 49/24 156/156 |
| 2007/0071973 A1 * | 3/2007 | Gleich | C03C 25/26 428/375 |
| 2009/0250847 A1 * | 10/2009 | Burchardt | B29C 33/0061 264/511 |
| 2010/0135819 A1 * | 6/2010 | Hibbard | B29C 70/14 416/241 R |
| 2011/0121487 A1 * | 5/2011 | Topping | B29C 70/48 264/258 |
| 2011/0308703 A1 * | 12/2011 | Ossanai | B29C 70/541 156/93 |
| 2012/0009070 A1 * | 1/2012 | Bech | F03D 1/065 416/230 |
| 2012/0040106 A1 * | 2/2012 | Simmerer | B29B 15/122 427/560 |
| 2012/0139165 A1 * | 6/2012 | Ramm | B29C 70/443 264/492 |
| 2012/0257984 A1 * | 10/2012 | Frederiksen | B29C 70/48 416/232 |
| 2012/0279402 A1 * | 11/2012 | Micarelli | B29C 70/44 100/219 |
| 2013/0165548 A1 * | 6/2013 | Tadepalli | C08G 69/04 523/400 |
| 2013/0241117 A1 * | 9/2013 | Lind | B29C 70/443 264/511 |
| 2014/0167328 A1 * | 6/2014 | Petzel | B29C 35/0261 264/442 |
| 2015/0217488 A1 * | 8/2015 | Allman | B29C 70/48 264/152 |
| 2015/0314536 A1 * | 11/2015 | Smith | B29B 11/16 156/222 |
| 2015/0314537 A1 * | 11/2015 | Dahl | F03D 13/10 264/510 |
| 2015/0314583 A1 * | 11/2015 | Jess | B29C 31/085 156/324.4 |

FOREIGN PATENT DOCUMENTS

| | | | |
|---|---|---|---|
| CN | 103481524 A | * | 1/2014 |
| CN | 103481524 A | | 1/2014 |
| EP | 0865900 A1 | | 9/1998 |
| EP | 2255957 A1 | | 12/2010 |
| EP | 2607400 A1 | | 6/2013 |
| WO | 2010083840 A2 | | 7/2010 |
| WO | 2013007351 A1 | | 1/2013 |

OTHER PUBLICATIONS

United Kingdom Patent and Trademark Office, Search and Examination Report issued in Application No. GB1401768.5, dated Sep. 17, 2014.

The State Intellectual Property Office of China, First Notification of Office Action in CN Application No. 201580015349.5, dated May 2, 2017.

* cited by examiner

WIND TURBINE COMPONENTS

FIELD OF THE INVENTION

The present invention relates to a method of making wind turbine components, and in particular, but not exclusively, to a method of making wind turbine blades.

BACKGROUND TO THE INVENTION

FIG. 1 illustrates in perspective view a prior art wind turbine blade 10. The wind turbine blade 10 extends longitudinally from a generally cylindrical root 30 to a tip 34. In use, the root end 30 of the blade 10 is attached to a hub of a wind turbine (not shown). In cross-section, the blade 10 transitions from a circular profile at the root 30 to an airfoil profile at the widest part of the blade 10, which is known as the 'shoulder' 36. Between the shoulder 36 and the tip 34, the blade has an airfoil profile that steadily decreases in thickness and chord moving towards the tip 34.

FIG. 2 illustrates the blade 10 in cross-section and reveals that the blade 10 comprises an outer shell 12 that is fabricated from first and second half shells 14, 16. The half shells 14, 16 are laminated structures that are moulded from glass-fibre reinforced plastic (GRP). Each half shell 14, 16 comprises inner and outer skins 18, 20 with integrated load-bearing elements in the form of spar caps 22 formed from carbon fibre pultrusions arranged in a stack between the inner and outer skins 18, 20. Foam panels 24 typically fill the gaps between the load-bearing elements.

The half shells 14, 16 are moulded in separate mould halves. Once each half shell 14, 16 has been moulded, the two half shells 14, 16 are brought together by closing the mould, and the half shells 14, 16 are bonded together to form the complete blade 10.

To form a half shell 14, 16, one or more layers of dry glass-fibre fabric are placed on a mould surface of the mould half. These layers will later form the outer skin 20 of the blade 10. Structural elements, including the spar caps 22 and the foam panels 24, are then arranged on top of the outer fabric layers. One or more further layers of dry glass-fibre fabric are then placed over the structural elements, and will later form the inner skin 18.

Next, the elements of the half shell 14, 16 are covered with an airtight bag to form an evacuation chamber encapsulating the various components of the blade shell that are arranged in the mould. The chamber is evacuated using a vacuum pump, and a supply of liquid resin is connected to the chamber. The resin is introduced into the chamber and infuses between the encapsulated components.

Prior to the infusion step, the components in the blade mould are generally heated to an elevated temperature of around 30° C. This is typically achieved by using a heated blade mould, with the heat source being provided, for example, by heating elements embedded in the mould or via hot fluids. The resin is also heated to around 30° C. prior to its admission into the mould. Pre-heating the components in the mould assists the resin infusion process because it reduces heat transfer from the resin to the components in the mould, which would otherwise cause the viscosity of the resin to increase and would inhibit the flow of resin in the mould. Once the components have been infused with resin, the assembly undergoes a curing cycle to harden the resin.

The method described above is time-consuming, with a large number of components being moved into and out of the blade mould, often by hand. Any step that holds up the process is therefore highly undesirable, and steps are taken where possible to minimise the time required to lay-up, infuse and cure the components in the blade mould.

For example, in some regions of the blade 10, it is desirable to incorporate a plurality of stacked glass fibre layers into the outer skin 20. This is particularly desirable in regions of the blade 10 that need to be particularly stiff, such as at the root 30 and near the shoulder 36 of the blade 10. However, introducing multiple glass fibre layers into the mould is time-consuming, as each layer needs to be carefully aligned in the stack, and the infusion and curing time increases for thicker layers of glass fibre.

In order to reduce the lay-up time, it is known to form glass fibre pre-forms offline, which are subsequently placed in the mould. The pre-forms comprise multiple layers of dry glass fibre fabric that are cut to the required size and attached together by stitching, adhesive or another suitable means. The pre-forms are then arranged in the required locations in the mould in a single step, thereby dispensing with the time-consuming task of assembling multiple fabric layers in the mould.

However, glass fibre is a highly insulating material, and the inventors have found that glass-fibre pre-forms, being of relatively high thickness compared to a single sheet of glass fibre, take a relatively long time to heat up compared to other components in the mould. As a result, it can take a long time to heat the pre-forms in the mould to the required elevation temperature prior to resin infusion commencing.

Against this background, it is an object of the present invention to reduce the production time of a wind turbine component, such as a wind turbine blade.

STATEMENTS OF THE INVENTION

The invention resides in a method of making a wind turbine component. The method comprises providing a mould, placing a fibrous pre-form in the mould, admitting resin into the mould and curing the resin. The method also comprises heating the fibrous pre-form before placing the pre-form in the mould.

The invention therefore provides a method in which the pre-form is pre-heated before it is placed in the mould for resin infusion. In this way, the waiting time for the pre-form to be heated up to the required elevated temperature when the pre-form is in the mould awaiting infusion is reduced, or even eliminated. Thus, the cycle time for making the wind turbine component in the mould is significantly reduced. As a pre-form can typically take several hours to heat up to a required temperature, the reduction in the in-mould cycle time represents a significant increase in the speed and efficiency of the manufacturing process, thereby enabling wind-turbine components to be produced more efficiently and hence at lower cost.

The pre-form comprises multiple layers of dry glass fibre fabric, that is the preform has not been infused or impregnated with resin before it has been placed in the mould.

The method may further comprise heating the fibrous pre-form to a first temperature before placing the pre-form in the mould, and admitting resin into the mould at a second temperature, wherein the first temperature is higher than the second temperature. In this way, a degree of heat loss can be tolerated as the fibrous pre-form is transferred to and placed in the mould, and while other stages of the manufacturing process are carried out before resin is admitted to the mould. In alternative embodiments, the fibrous pre-form may be heated to a temperature that is near the first temperature before placing the pre-form in the mould, and then heated further in the mould to reach the first temperature.

The first temperature, to which the fibrous pre-form is heated before it is placed in the mould, may be between approximately 30° C. and approximately 80° C.

Pre-heating the fibrous pre-form may comprise arranging the fibrous pre-form in contact with one or more heating devices. In this way, heating may be accomplished using a simple and inexpensive method.

For secure storage of the pre-form during heating, the method may comprise arranging the fibrous pre-form on a support. In this case, for compact storage, the method may comprise arranging a heating device between the support and the fibrous pre-form.

To reduce heat loss to the surroundings as the fibrous pre-form is pre-heated, the method may comprise arranging an insulating layer over the fibrous pre-form.

The or each heating device may be a heating mat or heating blanket. In this way, the heating device is relatively inexpensive, and can be easily removed from the support if required.

The method may comprise heating a plurality of fibrous pre-forms together. Typically, multiple fibrous pre-forms will be required to make the wind turbine component, so heating a plurality of fibrous pre-forms together in this way increases the efficiency of the heating process still further.

In embodiments where a plurality of fibrous pre-forms are heated together, the method may comprise stacking a plurality of pre-forms on a support. By stacking the fibrous pre-forms, the ratio of the surface area to the volume of the fibrous pre-forms is kept low, thereby reducing heat loss to the surroundings. To reduce heat loss still further, a heating device and/or an insulating layer may be arranged between the fibrous pre-forms in the stack.

So as to ensure that the or each fibrous pre-form has been heated to a requisite temperature when it is needed for arrangement in the mould, the method may comprise storing the or each fibrous pre-form in a heated state.

For particular efficiency of the manufacturing process, the method may comprise making and heating the or each fibrous pre-form simultaneously. For example, the fibrous pre-form may be made on a heated surface.

The fibrous pre-form may be a glass fibre pre-form.

The wind turbine component may be a wind turbine blade.

The invention also extends to a wind turbine component made according to the method described above, and to a wind turbine comprising such a wind turbine component.

The invention extends further to a wind turbine blade made according to the method described above, and to a wind turbine comprising such a wind turbine blade.

BRIEF DESCRIPTION OF THE DRAWINGS

FIGS. 1 and 2, which are respectively perspective and cross-sectional views of a wind turbine blade, have already been described above by way of background to the invention. In order that the invention might be more readily understood, reference will now be made, by way of example only, to the accompanying drawings, in which:

DETAILED DESCRIPTION OF EMBODIMENTS OF THE INVENTION

Figure 1:
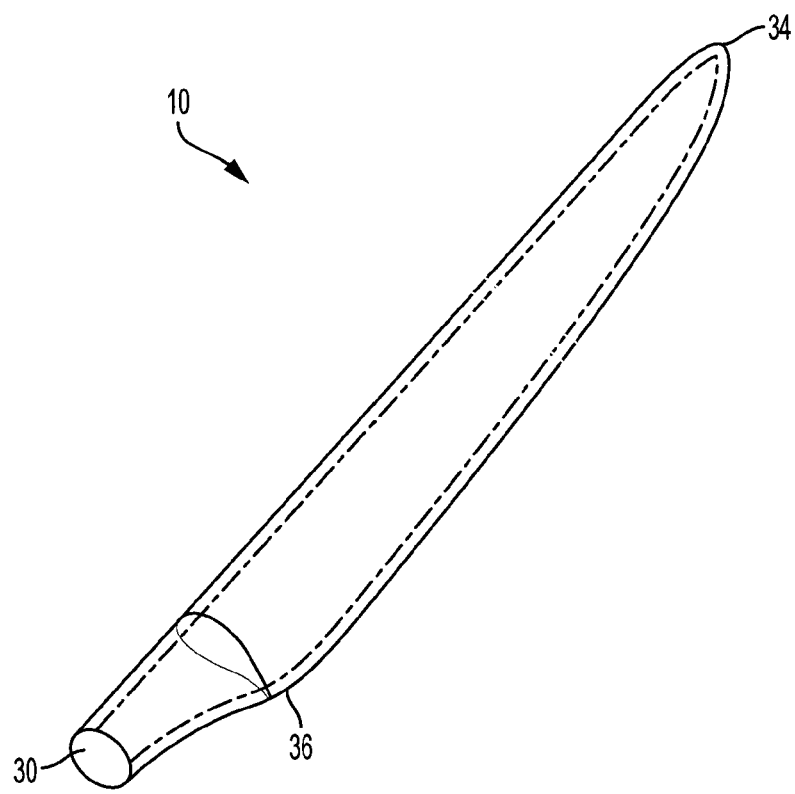
Figure 2:
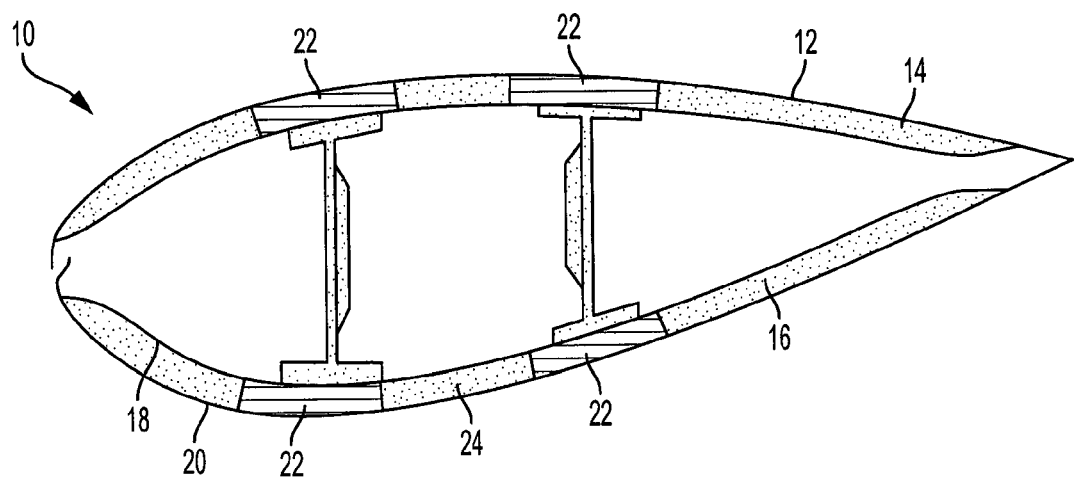
Figure 3:
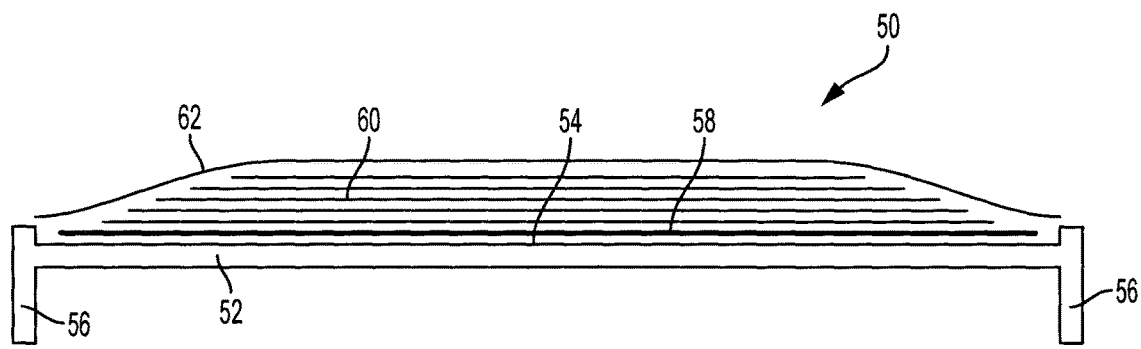
FIG. 3 is a front view of a pre-form heating apparatus in use in heating a pre-form.

FIG. 3 illustrates a pre-form heating apparatus 50 for heating a pre-form 60 before the pre-form 60 is arranged in a mould 70 (not shown in FIG. 3, but visible in FIG. 4) for incorporation into a wind turbine component. In this example, the wind turbine component is a wind turbine blade, and the mould is a half mould 70 for moulding a half shell of the wind turbine blade.

The pre-form heating apparatus 50 comprises a support 52, in the form of a flat surface 54 that is supported above the ground by legs 56. A heating device which in this example is in the form of a heating mat 58 is arranged on the flat surface 54 of the support 52. In use, a pre-form 60 is arranged on the heating mat 58, and an insulating blanket 62 covers the pre-form 60.

Figure 4:
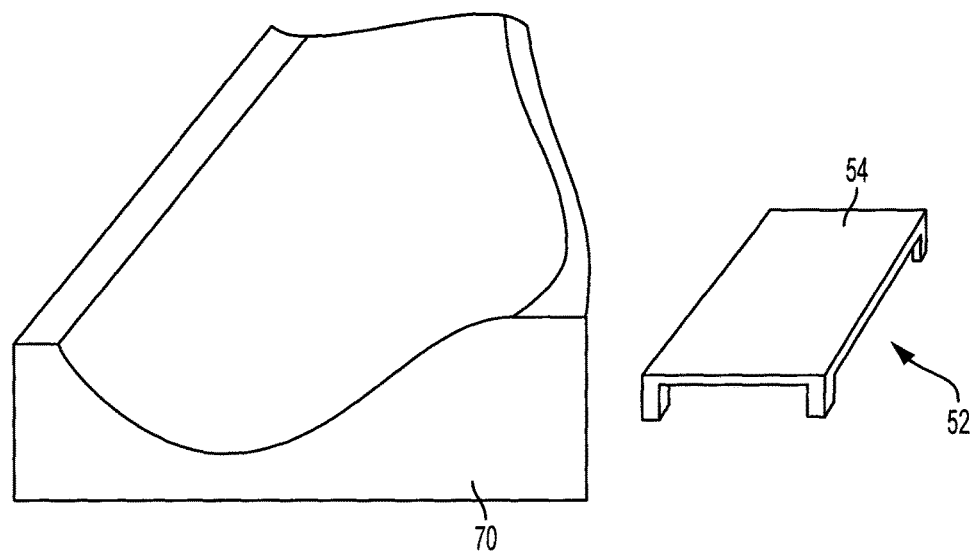
FIGS. 4 to 9 illustrate in perspective view stages of a method of making a wind turbine blade according to an embodiment of the invention, using the pre-form heating apparatus of FIG. 3.

In the embodiment illustrated, as shown in FIG. 4, the support 52 is arranged near the mould half 70.

Figure 5:
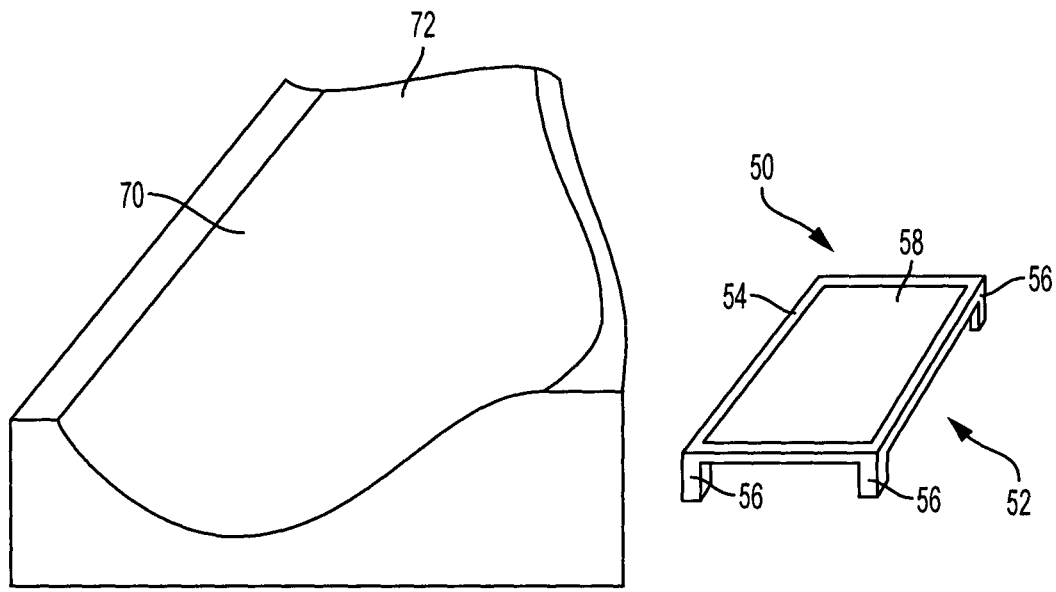
Figure 6:
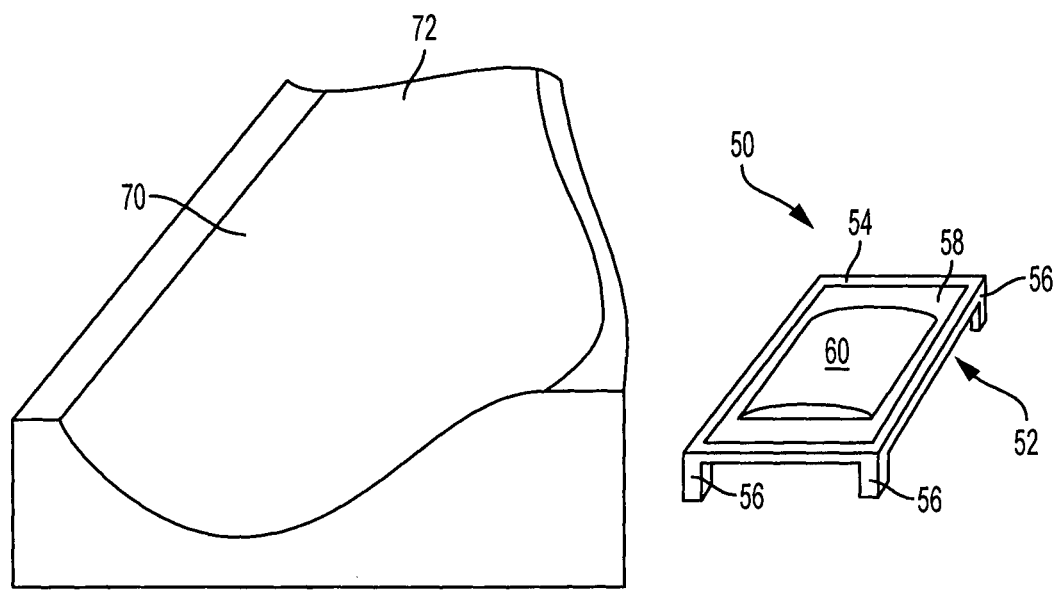
Figure 7:
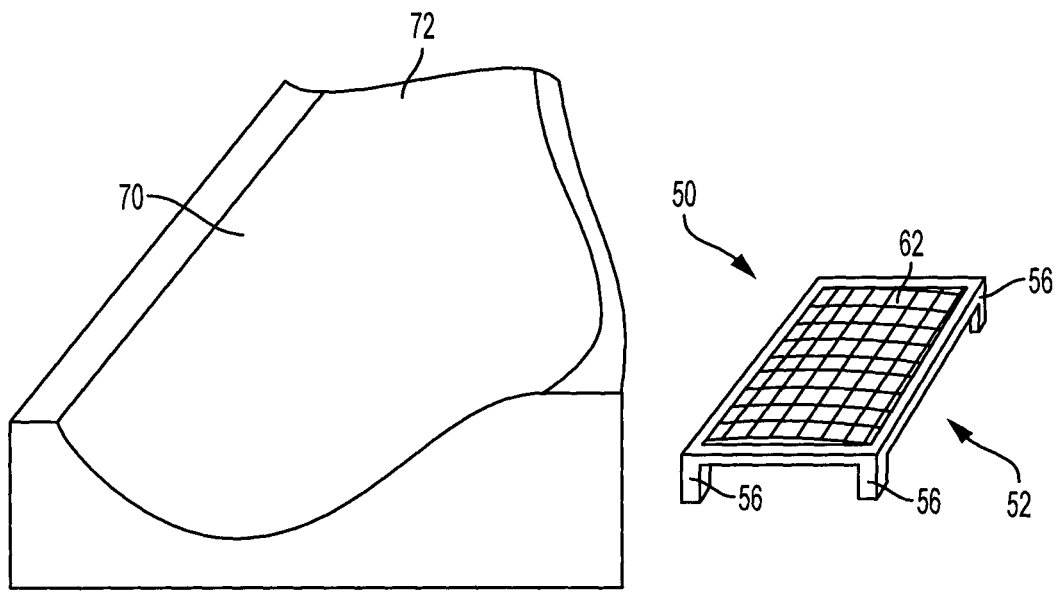

Referring now to FIGS. 5 to 9, to heat the pre-form 60, the heating mat 58 is arranged on the flat surface 54 of the support 52, as shown in FIG. 5. Next, and as shown in FIG. 6, the pre-form 60 is arranged in contact with the heater mat 58, such that the heater mat 58 is arranged between the support 52 and the pre-form 60. As shown in FIG. 7, the insulating blanket 62 is then laid over the pre-form 60 to complete the pre-form heating apparatus 50.

The heating mat 58 is activated, and the pre-form 60 is heated up to a first temperature, which in this example is 40° C. A first temperature of approximately 40° C. is particularly advantageous because at 40° C. manual handling of the pre-form 60 is permitted by health-and-safety regulations with the use of appropriate safety equipment. As the pre-form 60 is heated, the insulating blanket 62 helps to reduce heat loss to the surroundings, thereby reducing the time required to heat the pre-form 60 up to the first temperature.

As the pre-form 60 is heating up, the mould half 70 is prepared for the lay-up process. In particular the mould half 70 is heated, for example by heating elements embedded in the mould. Once the mould half 70 has been heated, early stages of the lay-up are carried out, and components are laid up on a mould surface 72 of the heated mould half 70. Eventually a stage of the lay-up process is reached where the heated mould-half is ready to receive the pre-heated pre-form 60.

The time required to pre-heat the pre-form 60 depends on the thickness of the pre-form 60, and the power supplied by the heating mat 58. In some cases it may take several hours to pre-heat the pre-form 60. The pre-heating of the pre-form 60 is timed such that the pre-form 60 has already reached the first temperature when the heated mould-half 70 is ready to receive the pre-heated pre-form 60. To ensure that the pre-form 60 has reached the first temperature in time, the pre-form 60 may be stored in the pre-form heating apparatus 50 in a heated state until it is needed.

Figure 8:
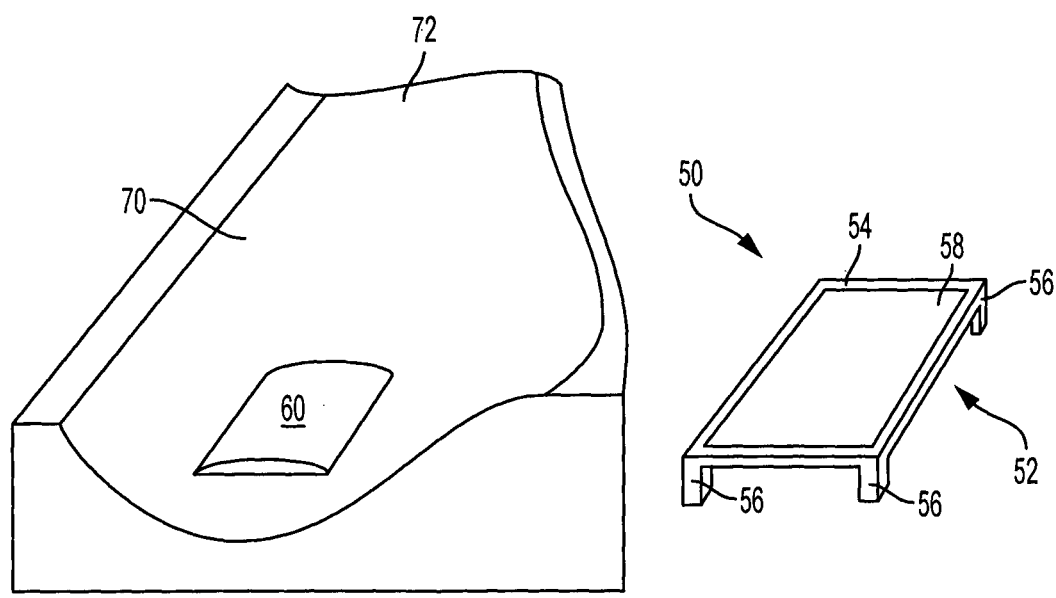

In this way, as soon as the pre-form 60 is required, the pre-heated pre-form 60 is at the first temperature, and is ready to be transferred to the heated mould half 70 and laid up on the heated mould surface 72, as shown in FIG. 8. The transfer may be carried out manually by hand, using appropriate safety equipment, or the transfer may be partially- or fully-mechanised.

Figure 9:
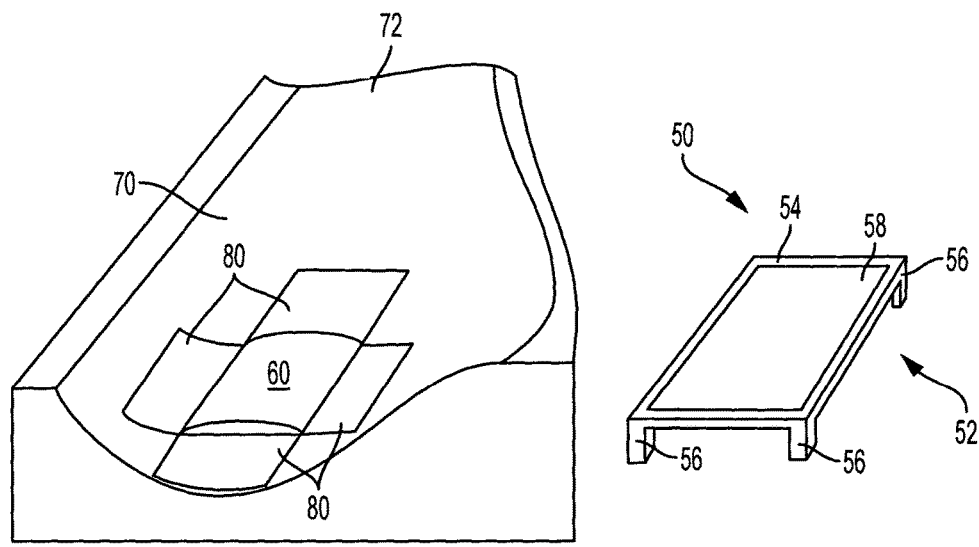

Once the pre-heated pre-form 60 has been laid up on the heated mould surface 72, other components 80 of the blade are laid up on the heated mould surface 72, as shown in FIG. 9. The lay-up process then continues until all the components of the half shell have been laid up in the mould half 70.

The other components 80 of the half shell are typically thinner than the pre-form 60, and so are quickly heated by the heated mould half 70 to a temperature that is at or near the first temperature. Meanwhile, the heated mould half 70 maintains the temperature of the pre-heated pre-form 60 at or near the first temperature.

In this way, all of the components 60, 80 in the mould half 70 quickly reach a temperature that is at or near the first temperature, so that the infusion process can begin without the need to wait for the pre-forms 60 to heat up.

With the pre-heated pre-forms 60 and the other components 80 in place in the mould half 70, the components 60, 80 are covered with an airtight bag to form an evacuation chamber encapsulating the components 60, 80. The chamber is evacuated using a vacuum pump, at which stage the chamber is ready for resin infusion.

As the chamber is evacuated, a supply of liquid resin is heated to a second, infusing temperature. The second temperature is below the first temperature, and in this example is approximately 30° C. Once the chamber has been evacuated and the resin has been heated to the second temperature, the supply of heated resin is connected to the chamber. The heated resin is introduced into the chamber and infuses between the encapsulated components, including the pre-heated pre-form 60 and the other components 80.

Because the pre-heated pre-form 60 and the other components 80 of the half shell are at or near the first temperature, which is higher than the temperature of the infusing resin, the resin maintains its temperature as it is infused. In this way, the fluidity of the resin, which is temperature-dependent, is maintained at the level required for fast and effective infusion. Furthermore, maintaining the temperature of the resin at the second temperature means that the resin can be heated more quickly to the curing temperature, which in this example is approximately 80° C.

Thus, by pre-heating the pre-form 60, the cycle time for heating the components of the half shell is reduced, and the temperature of the infusing resin can be maintained, resulting in a faster infusion process, and a faster curing time. The time required for a manufacturing cycle is therefore significantly reduced.

Figure 10:
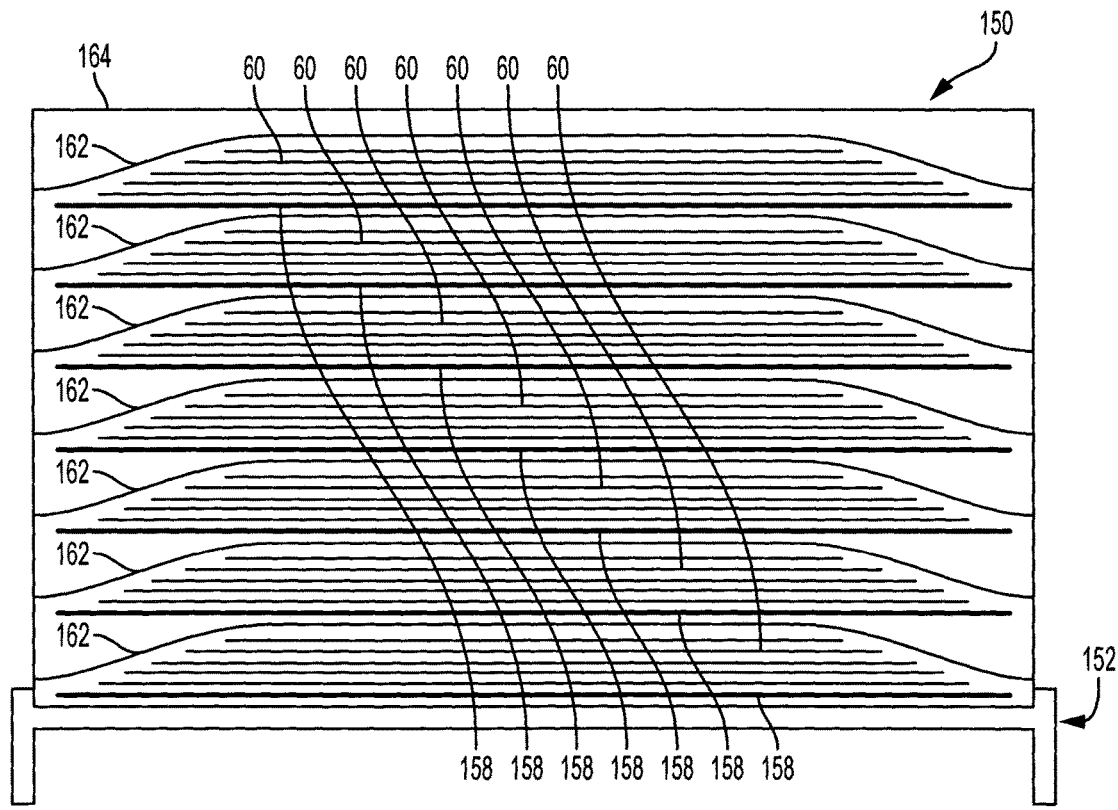
FIG. 10 is a front view of another pre-form heating apparatus in use in heating a plurality of pre-forms arranged in a stack.

FIG. 10 illustrates an alternative embodiment of the pre-form heating apparatus 150. In this embodiment, the pre-form heating apparatus 150 supports and heats a plurality of pre-forms 60. The pre-forms 60 are arranged in a stack on the support 152, with a heating mat 158 arranged in contact with a lower surface of each pre-form 60, and an insulating blanket 162 laid over an upper surface of each pre-form 60. In this way, a heating mat 158 and an insulating blanket 162 is arranged between neighbouring pre-forms 60 in the stack. A protective, insulating case 164 is arranged over the entire stack of pre-forms 60, to protect the pre-forms from the surroundings, to help maintain the pre-forms at the first temperature, and also to protect personnel in the vicinity of the pre-form heating apparatus 150 from contact with the heated stack.

In this way, a plurality of pre-heated pre-forms 60 can be stored in the pre-form heating apparatus 150 in a heated state, until the pre-forms 60 are required for lay-up in the mould half 70.

Embodiments of the invention are also envisaged in which the pre-forms 60 are made on a heated support, or are otherwise made such that the pre-forms 60 are made and heated simultaneously. Once made, the pre-forms 60 may be stored on the same support where they continue heating up to the first temperature, or the pre-forms 60 are transferred to another heated support, such as the pre-form heating apparatus 50, 150 described above for continued heating.

Still other embodiments are envisaged in which the individual layers of the pre-form 60 are heated separately before the individual layers are stitched together to make the pre-form 60.

In the illustrated embodiments the pre-form heating apparatus is arranged next to the mould half. However, this need not necessarily be the case, and the pre-form heating apparatus may be arranged in any suitable location. If required, the pre-form heating apparatus may be transferred form a location away from the blade mould to a location near the blade mould. Alternatively, the pre-heated pre-forms may be removed from the pre-form heating apparatus and transferred to the mould half in an insulating apparatus or on a transportable heating apparatus, to prevent heat loss during transfer.

Although in the embodiments described the first temperature is approximately 40° C. and the second temperature is approximately 30° C., this need not be the case, and the first and second temperatures may be any suitable temperatures. Whilst it may be advantageous to pre-heat the pre-forms to a temperature that is greater than the temperature of the resin used in the infusion process, this is not essential. For example, the pre-forms may be heated to the same temperature as the resin. In other embodiments, the pre-forms may be heated to a lower temperature than the resin before the pre-forms are placed in the mould, and the pre-forms may then undergo additional heating once placed in the mould to further elevate the temperature of the pre-forms.

The present invention is therefore not limited to the exemplary embodiments described above and many other variations or modifications will be apparent to the skilled person without departing from the scope of the present invention as defined in the following claims.

The invention claimed is:

1. A method of making a wind turbine component, the method comprising:
providing a mould, the mould defining a half shell of a wind turbine blade;
providing a fibrous pre-form, the fibrous pre-form comprising multiple layers of dry glass fibre fabric attached together;
heating the fibrous pre-form outside of the mould to a heated state;
placing the fibrous pre-form in the mould while in the heated state;
admitting resin into the mould; and
curing the resin.

2. The method of claim 1, further comprising:
heating the fibrous pre-form to a first temperature before placing the fibrous pre-form in the mould, and
admitting resin into the mould at a second temperature, wherein the first temperature is higher than the second temperature.

3. The method of claim 2, wherein the first temperature is between 30° C. and 80° C.

4. The method of claim 1, wherein heating the fibrous pre-form comprises arranging the fibrous pre-form in contact with one or more heating devices.

5. The method of claim 4, comprising arranging the fibrous pre-form over a support.

6. The method of claim 5, comprising arranging the or each heating device between the support and the fibrous pre-form.

7. The method of claim 5, comprising arranging an insulating layer over the fibrous pre-form.

8. The method of claim 4, wherein the or each heating device is a heating mat or heating blanket.

9. The method of claim 4, comprising heating a plurality of fibrous pre-forms together.

10. The method of claim 9, comprising stacking the plurality of fibrous pre-forms on a support.

11. The method of claim 10, comprising arranging a heating device and/or an insulating layer between the fibrous pre-forms in the stack.

12. The method of claim 1, comprising storing the fibrous pre-form in a heated state.

13. The method of claim 1, comprising making and heating the fibrous pre-form simultaneously.

14. The method of claim 13, comprising making the fibrous pre-form on a heated surface.

15. The method of claim 1, wherein the wind turbine component is a wind turbine blade.

16. The method of claim 1, wherein the multiple layers of dry glass fibre fabric are attached together by stitching or adhesive.

17. The method of claim 1, further comprising:
heating the mould while the fibrous pre-form is placed in the mould.

18. A method of making a wind turbine rotor blade from a pair of half shells, the method comprising:
providing a mould, the mould defining a half shell of the wind turbine blade;
providing a support adjacent to the mould, the support including a heated surface supporting one or more fibrous pre-forms on the heated surface and an insulating layer over the one or more fibrous pre-forms, the or each fibrous pre-form comprising multiple layers of dry glass fibre fabric attached together;
heating the one or more fibrous pre-forms on the support to a heated state;
removing at least one of the one or more fibrous pre-forms from the support and placing the at least one fibrous pre-form in the mould while in the heated state;
admitting resin into the mould; and
curing the resin.

19. The method of claim 18, wherein the one or more fibrous pre-forms include a plurality of pre-forms arranged in a stack and being supported by the support, wherein each pre-form includes an insulating layer overlying the pre-form.

20. A method of making a wind turbine rotor blade from a pair of half shells, the method comprising:
providing a mould, the mould defining a half shell of the wind turbine blade and having heaters for heating the mould;
providing a support adjacent to the mould, the support including a heated surface supporting one or more fibrous pre-forms on the heated surface, the or each fibrous pre-form comprising multiple layers of dry glass fibre fabric attached together;
heating the one or more fibrous pre-forms on the support to a first temperature;
removing at least one of the one or more fibrous pre-forms from the support and placing the at least one fibrous pre-form in the mould while in a heated state;
activating the heaters on the mould to maintain the at least one fibrous pre-form at or near the first temperature;
admitting resin into the mould at a second temperature, wherein the first temperature is higher than the second temperature; and
curing the resin.

* * * * *